Figure 1:
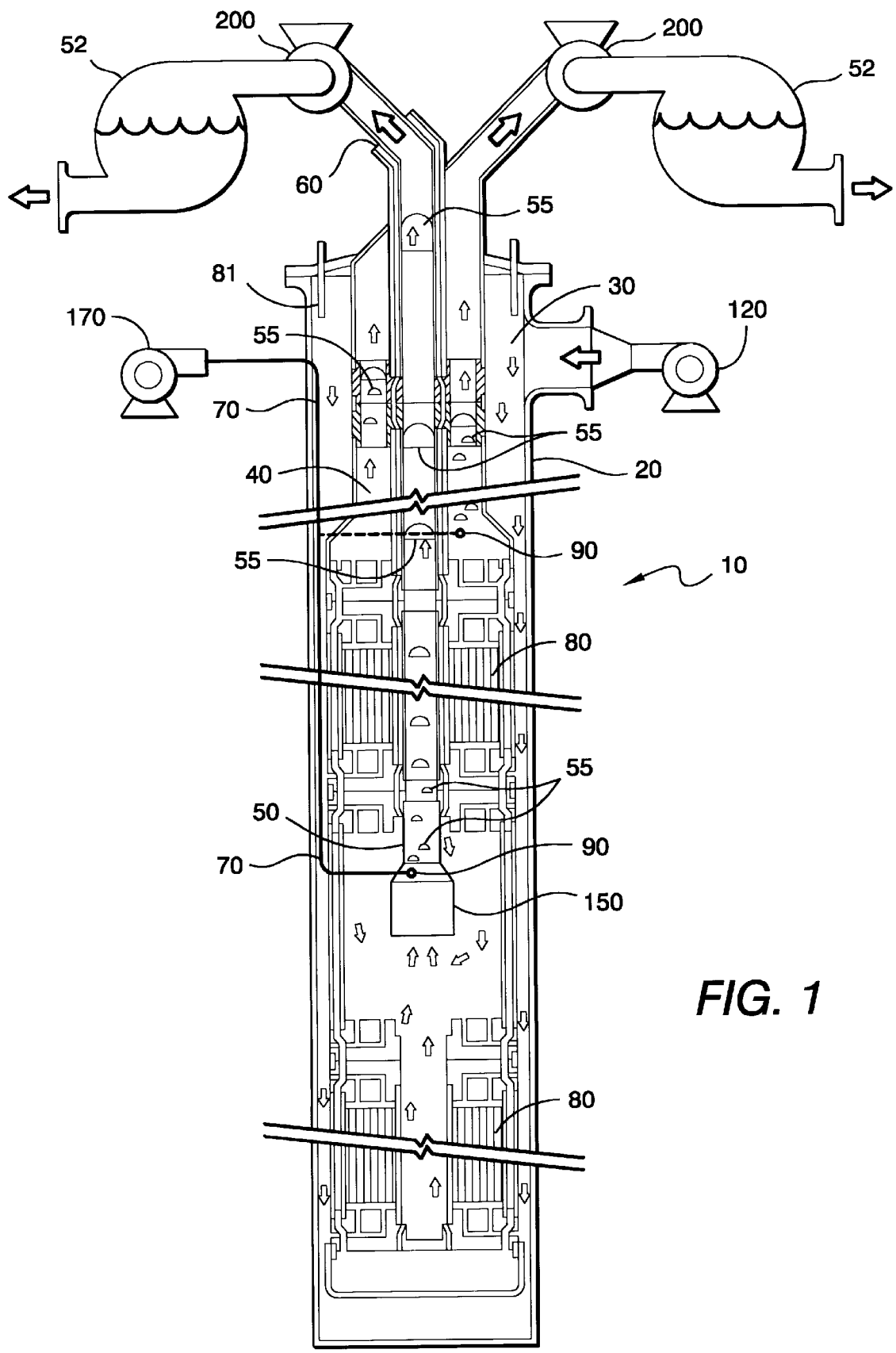

United States Patent [19]
Chancellor

[11] Patent Number: 5,980,751
[45] Date of Patent: Nov. 9, 1999

[54] AIR LIFT PUMP FOR MEMBRANE SEPARATION UNIT

[75] Inventor: Dennis H. Chancellor, Woodland Hills, Calif.

[73] Assignee: NATE International, Woodland Hills, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/009,395

[22] Filed: Jan. 20, 1998

Related U.S. Application Data

[62] Division of application No. 08/722,868, Sep. 26, 1996, abandoned.

[51] Int. Cl.$^6$ .................................................. B01D 61/02
[52] U.S. Cl. ........................................ 210/652; 210/747
[58] Field of Search ................................. 210/652, 747, 210/170, 192, 257.2, 258, 259, 321.78, 321.79, 321.8, 321.81, 321.88, 321.89, 321.9, 416.1, 416.3, 650, 641

[56] References Cited

U.S. PATENT DOCUMENTS

| | | | |
|---|---|---|---|
| 4,040,486 | 8/1977 | Kirkland | 166/311 |
| 4,085,971 | 4/1978 | Jacoby | 299/4 |
| 4,125,463 | 11/1978 | Chenoweth | 210/170 |
| 4,135,364 | 1/1979 | Busick | 60/325 |
| 4,160,622 | 7/1979 | Colburn | 417/181 |
| 4,366,063 | 12/1982 | O'Connor | 210/652 |
| 4,606,867 | 8/1986 | Eguchi | 261/122 |
| 4,759,849 | 7/1988 | Baumann | 210/652 |
| 4,880,057 | 11/1989 | Derowitsch | 166/267 |
| 4,917,832 | 4/1990 | Marcum | 261/77 |
| 5,190,648 | 3/1993 | Ramsauer | 210/172 |

*Primary Examiner*—Ernest G. Therkorn
*Attorney, Agent, or Firm*—Robert D. Fish; Crockett and Fish

[57] ABSTRACT

A semi-permeable membrane based purification system expresses permeate through a membrane, and uses an air lift pump to raise the permeate. In particularly preferred embodiments, a plurality of membranes are positioned at least several hundred feet below the surface of the each, and are used to desalinate salty or brackish water. Ozone may be used to further purify the water and help maintain the integrity of the membranes.

9 Claims, 1 Drawing Sheet

AIR LIFT PUMP FOR MEMBRANE SEPARATION UNIT

This application is a divisional of application Ser. No. 08/722,868 filed Sep. 26, 1996, now abandoned.

1. FIELD OF THE INVENTION

The present invention relates generally to pumps.

2. BACKGROUND OF THE INVENTION

Despite numerous advances over the years, there exists a continuing need for improved liquid purification. In my copending application, allowed U.S. Ser. No. 08/925055, which is incorporated herein by reference, I describe a novel reverse osmosis system in which a plurality of reverse osmosis membranes are placed within a well or other underground channel. The channel contains an unpurified liquid such as salty or brackish water, and is deep enough that overhead pressure cooperates with the membranes to select out a permeate. Such a system greatly reduces the amount of liquid that needs to be pumped, but still requires raising the permeate from a significant depth, which in the case of processing salt water may be approximately 1800 feet.

It is known to raise a liquid from a well or other underground channel using a series of positive pressure mechanical pumps. That solution, however, is problematic in that one or more of the pumps may fail during operation, and may therefore require raising of the entire chain of reverse osmosis membranes to the surface to effect repairs. Placing pumps below the ground also requires providing an electrical or other power line to the pumps, which adds complexity, cost, and further opportunities for failure.

It is therefore desirable to locate the pumping mechanism at or above ground level. One way of accomplishing that goal is to use an air lift pump. Air lift pumps have been known for at least 200 years. As exemplified by U.S. Pat. No. 4,917,832 to Marcum et al., air lift pumps generally include a source of compressed gas such as oxygen or air, a tube which carries the compressed gas to a diffuser at a subsurface level, a means for mixing the compressed air exiting the diffuser with the liquid to be raised, and a plurality of riser pipes in which the liquid and gas are permitted to rise. It is known that the use of relatively larger bubbles, especially those which extend completely across the interior of the inner riser pipe, tends to increase the volume of liquid pumped.

Liquids rising under the force of an air lift pump may exit the riser pipes with considerable force. Such water may be deflected with a deflector, and it may also be possible to harness some of the kinetic energy contained in the rising liquid by discharging such liquid through a turbine near the top of the risers. See, e.g., U.S. Pat. No. 4,135,364 to Busick et al.

3. SUMMARY OF THE INVENTION

A semi-permeable membrane based purification system expresses permeate through a membrane, and uses an air lift pump to raise the permeate. In particularly preferred embodiments, a plurality of membranes are positioned at least several hundred feet below the surface, and are used to desalinate salty or brackish water. Ozone may be used to further purify the water and help maintain the integrity of the membranes.

4. BRIEF DESCRIPTION OF THE DRAWINGS

Various objects, features, aspects and advantages of the present invention will become more apparent from the following detailed description, in conjunction with the accompanying drawings, wherein like numerals represent like components.

FIG. 1 is a schematic of a preferred liquid purification plant.

5. DETAILED DESCRIPTION

FIG. 1 depicts a reverse osmosis system 10 which generally comprises a shaft casing 20 and five main flow lines—a downflowing raw liquid line 30, an upflowing flushing liquid discharge line 40, an upflowing permeate line 50, an air vent 60 and a compressed gas line 70. Several reverse osmosis membranes 80 are placed at depths providing sufficient overhead operating pressure, and these membranes are coupled to the various flow lines such that permeate is expressed through the membranes into the permeate line 50.

The system 10 is operated by three pumps. Pump 120 forces raw liquid downward along raw liquid line 30, pump 150 forces permeate upward through permeate line 50, and pump 170 pumps compressed gas downwards through line 70. Near the bottom of permeate line 50 gas releasing unit 90 releases compressed gas 55, which then rises within permeate line 50, carrying permeate along with it. The compressed gas rising within the permeate line 50 expands as it rises, and pushes permeate upward with considerable force. The permeate raised upwards in this manner is then shunted through a turbine 200 to produce shaft energy which can then be used to generate electricity, or for some other purpose. It is specifically contemplated, for example, that energy derived from the turbine 200 be employed to operate the compressor 170, as an energy recovery or cogeneration power supply. Turbine 200 discharges into tank 52 for seperation of gas 55 and water.

A great many variations of the above described system are contemplated herein. For example, the flow patterns and the relative positions of the various flow lines are not limited to that shown. Thus, it would be entirely possible for the various flow lines to be positioned in a non-concentric manner, as where the upward flowing permeate line 50 is placed off center relative to the shaft casing 20. Similarly, the membranes about flow lines 50, 60 and 70 could be replaced with non-concentric membranes. In yet other embodiments, raw liquid could flow down line 40 and up line 30, or flushing liquid could be pumped up the discharge line rather than down the raw liquid line.

It is not at all necessary that air be used as the compressed gas. An inert gas such as nitrogen may be used instead of air to control growth of bacteria, and in that event the compressed gas would preferably be captured in tank 52 after passing through turbine 200, and recirculated to avoid loss into the atmosphere. It may also be desirable to include ozone in the compressed gas to further purify the liquid, and to maintain the integrity of the membranes. Ozone for this purpose may be produced and compressed according to U.S. Pat. Nos. 5,190,648 and 4,759,849. Ozone oxidizes, disinfects and deodorizes, and is 13 times more soluble in water than oxygen. Ozone also microfloxulates metals such as iron, aluminum, magnesium and calcium, precipitates heavy metal pollutants, kills bacteria 3,000 times faster than chlorine, kills virus, algae spores and parasites, controls formation of scales, and oxidizes oils. Regardless of what gas is compressed, it may be desirable to dehumidify the gas following decompression.

The gas releasing unit 90 may take many different forms. Perhaps the simplest possibility is for the compressed gas line 70 to terminate in an open pipe, or in a diffuser. Another possibility is for the air discharge unit 90 to include a screen as in U.S. Pat. No. 4,606,867 to Eguchi, or a as trapping means such as that described in U.S. Pat. No. 4,135,364. Both such embodiments would be intended to produce gas bubbles sufficiently large to optimize the amount of permeate raised. Another possibility is for the gas releasing unit to include a valve which releases gas intermittently, thereby again forming bubbles which are large relative to the inner diameter of the permeate line 50. Such a valve could be placed at the termination of the compressed gas line 70, or any another point upstream of the termination.

The diameter of the permeate line 50 is not especially critical. Lift pipes having an inner diameter of about 12 inches are known, but lift pipes having both smaller and larger inner diameters are also contemplated. It may also be advantageous for the permeate line 50 to have a larger internal diameter closer to the surface than is present at lower depths. Permeate line 50 may be modified from the drawing in still other ways as well. For example, permeate line 50 may comprise multiple tubes rather than the a single tube as shown, and those tubes may be parallel, or even spiraled about one another. Permeate line 50 may also include check valves to prevent backflow, and/or bubble collection areas in which smaller bubbles could collect into larger bubbles.

As noted in the copending Ser. No. 08/925,055 application, the reverse osmosis system may be deployed in many different environments and for many different purposes. For example, while a reverse osmosis system can be utilized to desalinate water, and may advantageously be located near a body of salty or brackish water, it can also be used to purify other substances such as industrial chemicals and various foods, and therefore may advantageously be located near a chemical or food processing plant. Similarly, wells need not be drilled specifically for the purposes identified herein, and abandoned water or oil wells may also be used.

The various lines can be constructed of many different materials, including plastic or other lightweight pipe such as PVC or fiberglass, steel and other metals and alloys. Depending on the relative positioning of the various lines, some of the lines need not have especially strong burst or collapse pressures since they will have approximately equal internal and external pressures. For example, line 50 may be positioned entirely within line 40, such that the walls of line 50 need only withstand the differential pressures between lines 40 and 50. Shaft casing 20 is preferably installed in 20 to 40 foot sections for convenient handling and shipping, and the sections may be connected to each other using techniques previously known to those in the well drilling industry.

The membranes 80 are preferably configured in van-shaped envelopes in accordance with the disclosure in my Ser. No. 08/925,055 application. The vane shape has several advantages, including increased surface area and flexibility. There are numerous materials from which the membranes may be constructed, including cellulose acetate and newer very thin membranes. Other newer materials may be used as well, including cellulose esters, polyethylene, polyvinyl chloride, polyvinylidene, chloride-polyvinyl chloride and others.

Different membranes operate at different differential pressures, and would therefore require different minimum depths to become operational. For example raw fresh water would require operating pressures of only 40 psi, brackish water will require greater pressures of around 200 psi minimum, and seawater will require pressures exceeding 600 psi at present membrane technology. The required osmotic pressures will, of course, change as membrane technology is improved, and it is contemplated that a preferred system for desalinating commonly encountered salty or brackish water will require a depth of at least 500 feet. It would also be possible to reduce the depth of the channel somewhat by pressurizing the channel. Of course, to the extent that pressurizing the channel involved additional costs, it would be more cost effective to provide a deeper channel. With present technology, it is contemplated that a channel according to the present invention would need to contain salt water to a depth of at least 1800 feet to be cost effective, and other liquids such as orange juice to a depth of at least 100 feet. Assuming atmospheric pressure above the channel, this would correspond to pressures at the external surfaces of the membranes from at least 40 to 600 psi.

Of course, it should be recognized that embodiments as herein described need not completely purify a liquid of interest. For example, various embodiments may be used to desalt brackish water from about 5000 ppm to 40000 ppm of salt down to about 500 ppm, while other embodiments desalt the same water down to about 50 ppm. Other ranges may be applicable to other removable particulates. To clarify matters, unless the context clearly indicates some other meaning, the terms "purify" and "purifying" are used herein to include both complete purification and incomplete purification, and the term "liquid" includes flowable compositions whether solutions, colloids or suspensions, and whether or not they contain water. Moreover, to further clarify matters, the terms "particle", "particles" and "particulate" are used herein to refer to any entity removable from a liquid by filtration, and specifically includes salts, heavy metal ions, and other chemical and biological contaminants.

It should be apparent to those skilled in the art that embodiments of the present invention address the problem mentioned above of pumping permeate upwards from the membranes of a channel based reverse osmosis unit. However, while specific embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A method of purifying a feed fluid comprising:
   providing an underground channel having an interior diameter;
   disposing the feed fluid in the channel and allowing the feed fluid to flow downwards;
   disposing a filter in the channel such that the filter produces a filtered fluid from the feed fluid;
   positioning an airlift pump in the channel above the filter, the airlift pump introducing bubbles into the filtered fluid that are too small to completely extend across the interior diameter of the channel; and
   using the airlift pump to raise at least a portion of the filtered fluid.

2. The method of claim 1 further comprising:
   disposing a membrane in the body of fluid; and
   using the membrane to filter out the portion of the fluid raised by the airlift pump.

3. The method of claim 1 wherein the fluid comprises at least one of salty and brackish water.

4. The method of claim 1 wherein the airlift pump utilizes ozone to lift the portion of fluid.

5. The method of claim 1 further comprising disposing a membrane in the body of fluid and using the membrane to filter out the portion of fluid raised by the airlift pump, wherein the fluid comprises at least one of salty and brackish water.

6. The method of claim 1 further comprising disposing a membrane in the body of fluid and using the membrane to filter out the portion of fluid raised by the airlift pump, wherein the fluid comprises at least one of salty and brackish water, and the airlift pump utilizes ozone to lift the portion of fluid.

7. The method of any one of claims 1–6 wherein the body of fluid comprises a channel extending below the surface to a depth of at least 100 feet.

8. The method of any one of claims 1–6 wherein the body of fluid comprises a channel extending below the surface to a depth of at least 500 feet.

9. The method of any one of claims 1–6 wherein the body of fluid comprises a channel extending below the surface to a depth of at least 500 feet.

* * * * *